United States Patent [19]
Romanowski

[11] Patent Number: 5,344,697
[45] Date of Patent: * Sep. 6, 1994

[54] FIRE-RETARDANT BARRIER STRUCTURE

[76] Inventor: John C. Romanowski, 5 Spring Rd., Londonderry, N.H. 03053

[ * ] Notice: The portion of the term of this patent subsequent to Dec. 4, 2007 has been disclaimed.

[21] Appl. No.: 621,369

[22] Filed: Nov. 30, 1990

Related U.S. Application Data

[63] Continuation-in-part of Ser. No. 324,098, Mar. 16, 1989, Pat. No. 4,975,316.

[51] Int. Cl.$^5$ ............................................... B32B 7/00
[52] U.S. Cl. ................................. 428/247; 428/246; 428/920; 428/921
[58] Field of Search ............... 428/289, 247, 920, 921, 428/246

[56] References Cited

U.S. PATENT DOCUMENTS 4,726,987  2/1988  Trask et al. ................... 428/921
4,975,316  12/1990  Romanowski ................ 428/247

Primary Examiner—James J. Bell
Attorney, Agent, or Firm—Wolf, Greenfield & Sacks

[57] ABSTRACT

Fire-retardant barriers are described which are useful for protecting military personnel and equipment from both fire and chemical and/or biological agents. The fire-retardant barriers are multilayered structures having desirable flammability characteristics and resistance to chemical and/or biological agents. The preferred barriers also possess favorable durability properties and are printable.

40 Claims, 1 Drawing Sheet

FIRE-RETARDANT BARRIER STRUCTURE

RELATED APPLICATION

This application is a continuation-in-part application of Ser. No. 324,098 filed on Mar. 16, 1989, entitled FIRE-RETARDANT BARRIER STRUCTURE, now U.S. Pat. No. 4,975,316, the contents of which are hereby expressly incorporated by reference.

FIELD OF THE INVENTION

This invention relates to fire retardant barriers useful for protecting equipment and personnel from fire, chemical and/or biological agents. The fire retardant barrier may be a laminated barrier structure composed of multi-layered plastic films and in particular to a composite, laminated-plastic fire-retardant fabric which includes a layer of coated plastic scrim.

BACKGROUND OF THE INVENTION

Plastic barrier materials are involved in an almost unlimited range of products and applications. Containers, wrappers, pouches and bottles of varying degrees of flexibility for foods, pharmaceuticals, chemicals, and myriad other products are commonplace. In addition to containing and protecting products, barrier sheet materials are used to protect equipment and even personnel from a wide range of environmental hazards. One application of such barriers having particularly stringent demands is that of protecting military personnel, equipment, and supplies. Here, in additions to being fire-retardant, the material should protect against a wide range of chemical and biological agents. It should also resist penetration liquids, gases, dust, including radioactive dust and not be susceptible to deterioration from ultraviolet light. Of course, the material should also be durable and relatively easily repaired when torn or punctured. In some instances where the barrier material is to be used in tents, equipment enclosures, or covers, it should have an outer surface in a mat finish and dull color to escape detection from the air. The outer surface should also be "printable" in that it should easily accept printed patterns such as those needed for camouflage.

Because the attainment of some of these qualities often results in the sacrifice of others, e.g. the addition of a fire retardant material to a material may affect its durability, there is not presently available a material which even nearly satisfies the needs of the military.

One of the better known commercial films sometimes used as a barrier is the copolymer of vinylidene chloride and vinyl chloride sold by the Dow Chemical company under the trademark SARAN®. It has a high resistance to attack by a wide range of chemicals, it has low permeability to gases and vapors, and it has high transparency. Moreover, it can be bonded or sealed to itself and to many other materials and substrates for special applications. The Dow company has made and sold widely combinations of SARAN® and outer layers of polyolefin resins including low density polyethylene (LDPE) and ethylene vinyl acetate (EVA) under the trademark SARANEX®. The SARANEX® films in turn have been further laminated or bonded to yet other materials. In an attempt to fill the need for a fire-retardant barrier film, it is believed that among the materials Dow has included with or added to SARANEX® is chlorinated polyethylene. However, it is believed that such combinations were not successful in meeting the requirements of a practical fire-retardant barrier.

SUMMARY OF THE INVENTION

This invention pertains to a fire-retardant barrier capable of resisting chemical and biological agents while still exhibiting a high degree of fire-retardant qualities. The barriers of this invention are useful in preparing items such as tents or clothing which may be used by military personnel in situations in which there is susceptibility to both chemical warfare and fire.

The fire-retardant barrier has a first component including a first layer for resisting chemical and biological agents. The first layer also contains a fire-retardant material. The barrier also has a second component attached to the first component, e.g. by lamination, including a second layer for imparting strength to the fire-retardant barrier. The barrier has at least two layers in the first component which contains a fire retardant material. The fire retardant barrier further may include additional layers in the first and second components.

This invention also pertains to a multilaminate barrier having a flammability characteristic of less than about sixty seconds based on Federal Test Method 191A - Method 5903 and a resistance to mustard and thickened GD of at least about four hours based on Chemical Research and Development Center - Special Procedure - 84010. This invention also pertains to a multilaminate barrier having a flammability characteristic of less than about sixty seconds based on Federal Test Method 5903 and a resistance to mustard and GB toxicological agents of at least fifty minutes based on IAW Military Standard 282. The above-tests are standardized tests accepted by industry, the military and/or government for evaluating flammability characteristics and resistances to toxicological agents.

A principal object of the present invention is a barrier which exhibits a high degree of fire-retardant qualities.

It is an object of the present invention to provide a material having in substantial measure all of the desired qualities necessary to protect personnel and equipment from fire, chemical agents and/or biological agents while still maintaining its durability and/or printability.

A further object is a barrier which is not only fire-retardant but which also resists penetration by liquids, gases, and dusts, particularly radioactive dust.

Another object is a barrier which is durable and relatively easily produced on a large scale.

Still another object is a fabric which is highly resistant to degradation caused by environmental factors including exposure to weather and ultraviolet radiation.

Still another object is a barrier which is both resistant to chemical and biological agents while exhibiting a high degree of fire-retardant qualities.

Yet another object is a barrier which has low reflective qualities as to both light and radar illumination and is relatively indistinguishable from land background.

For a better understanding of the present invention, together with other and further objects, features, and advantages, reference should be had to the following description of preferred embodiments which should be read with reference to the appended drawings in which:

DETAILED DESCRIPTION

Figure 1:
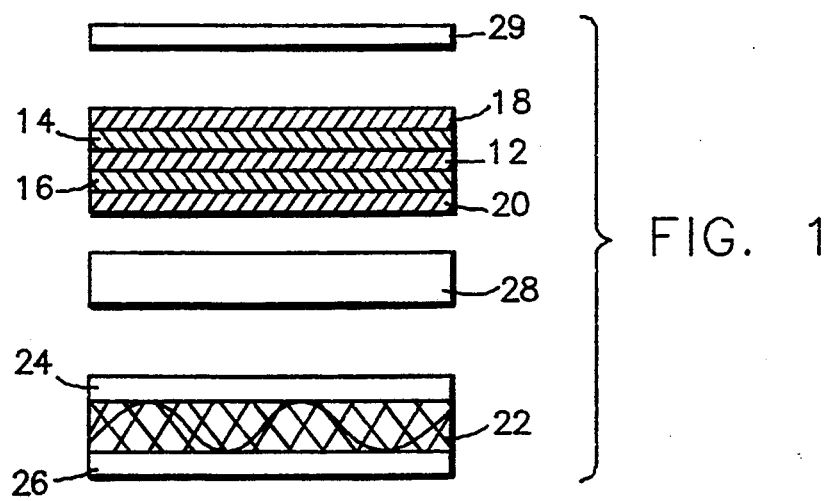
FIG. 1 is an exploded schematic cross-section of a composite fabric embodying the present invention.

This invention pertains to a fire-retardant barrier having a first component including a first layer for resisting chemical and biological agents and a second component attached to the first component including a second layer for imparting strength to the fire-retardant barrier. The first component also contains a fire-retardant material. The first layer of the first component may be multilayered itself and at least two layers of the first component contain a fire retardant material.

The first component may further include second and third layers on opposite sides of the first layer. The second or third layers may also contain a fire-retardant material or may be present for imparting various qualities to the first component, e.g. a non-tacky surface or to increase the thickness of the overall barrier. The fire retardant material in the second and/or third layers may be the same or different as that in the first layer.

The first layer may be any layer capable of resisting chemical or biological agents. Examples of such layers include a five layered coextruded film sold by Dow Chemical Company under the trademark SARANEX®, nylon, a nylon-SARAN® hybrid film, SARAN® being a trademark product of Dow Chemical Company, and ethylene vinyl alcohol films, or combinations thereof.

SARANEX® is a coextruding five layered film including layers arranged in the following order: low density polyethylene/ethyl vinyl acetate (EVA)/copolymer of vinylidene chloride and vinyl chloride/ethyl vinyl acetate/low density polyethylene. SARANEX® films are described along with methods of making such films in U.S. Pat. Nos. 3,479,425 to Dow Chemical Company issued Nov. 18, 1969 and 3,557,265 to Dow Chemical Company issued Jan. 19, 1971, the contents of both patents are hereby expressly incorporated by reference.

SARAN® films are a trademark product of Dow Chemical Company. SARAN® films are made of a copolymer of vinylidene chloride and vinyl chloride.

Nylon is a term applied to long chain synthetic polyamides having recurring amide groups as the integral part of the main polymer chain. Nylons which may be used within this invention are those sold by Allied Chemical Company and Dupont Chemical Company.

The second and third layers of the first component can be made of any material capable of being attached to the first layer and carrying additional reagents if necessary, e.g. fire-retardant materials or pigments. An example of materials useful for the second and third layers of the first component are polyolefin resins, e.g. polyethylene or polypropylene, more particularly low density polyethylene (LDPE).

The fire-retardant material is a material capable of imparting favorable fire-retardant characteristics or flammability characteristics into a layer of a different material, e.g. reduces or eliminates its tendency to burn. The term fire-retardant material is intended to include single fire-retardant agents or combinations thereof. Examples of such fire-retardant materials include antimony trioxide, and halogenated paraffins, e.g. chlorinated paraffins, or combinations thereof.

Chemical and biological agents are agents which are used in chemical or biological warfare. Examples of chemical agents include nerve agents such as TGD, VX, and GB, blistering agents such as mustard, blood agents and choking agents. Examples of biological agents include toxins, rickettsia, bacteria, and viruses. These examples are not intended to be limiting and if the first layer is capable of resisting at least one of these agent(s), then it is intended to be encompassed by the language "resisting chemical and biological agents" for purposes of this invention.

The second component attached to the first component includes a second layer for imparting strength to the fire-retardant barrier. A layer for imparting strength is intended to encompass layers which make the first component more resistant to tears and puncture when attached to the first component. The second layer of the second component may be made up of a multilayer system such as a woven scrim. In a preferred embodiment, the scrim is woven from a high density polyolefin material sandwiched between two layers of a low density polyolefin material. The most preferred scrim is woven from a high density polyethylene material sandwiched between two layers of a low density polyethylene material. At least one of the polyethylene containing layers contains a fire-retardant material, and in a preferred embodiment all of the polyolefin material in the second component, including both high density and low density forms, contain a fire-retardant material. Each layer may contain the same fire-retardant material or may contain a different fire-retardant material.

This invention also pertains to a multilaminate barrier having a flammability characteristic of less than about sixty seconds based on Federal Test Method 5903 and a resistance to mustard and thickened GD toxicological agents of at least about four hours based on Chemical Research and Development Center - Special Procedure - 84010. The multilaminate barrier contains at least two layers and may contain more than two if necessary to achieve the desired flammability and resisting characteristics.

A flammability characteristic is the ability of the barrier to self-extinguish when lit with a flame in a certain duration of time. The shorter the duration of time for self-extinguishing, the more favorable flammable characteristic of the barrier. The term flammability characteristic for purposes of this invention is interchangeable with after-flame time.

Federal Test Method 5903 is art recognized methodology for testing materials for their flammability characteristics. One of ordinary skill in the art would be able to locate the published guidelines for Federal Test Method 5903 and test their barrier pursuant to the guidelines to determine the flammability characteristic of various materials. Federal Test Method 5903 is an integral part of Federal Test Method Std. No. 191A. The contents of both published guidelines for Federal Test Method Std. No. 191A entitled, *Federal Standard for Textile Test Methods*, Jul. 20, 1978 and Federal Test Method 5903 entitled, *Flame Resistance of Cloth: Vertical*", Jul. 20, 1978, are hereby expressly incorporated by reference.

The Federal Test Method 5903 (hereinafter FTM 5903) is as described below. The method is intended for use in determining the resistance of cloth to flame and glow propagation and tendency to char. The tendency to char aspect of the method will not be discussed because it was not a characteristic used to describe the materials of this invention. FTM 5903 is designated primarily for cellulosic fabrics treated with a flame retardant but it may be used in other applications. In addition, the sample is held in a vertical position and the flame exposure conditions are common to tests of this type. The method further defines gas composition, burner, cabinet, temperature and humidity test conditions since it is designed primarily for interlaboratory testing of the same material. FTM 5903 is described in detail below under separate heading for purposes of clarity.

Federal Test Method Standard No. 191A

Federal Test Method 5903

Test Specimen

The specimen is a rectangle of cloth 2¾ inches (70 mm) by 12 inches (305 mm) with the long dimension parallel to either the warp or filling direction of the cloth. No two warp specimens contain the same warp yarns, and no two filling specimens contain the same filling yarns.

Number of Determinations

Five specimens from each of the warp and filling directions are tested from each sample unit.

Apparatus

Cabinet - A cabinet and accessories, fabricated in accordance with the requirements specified in Figures 5903A, B, and C of FTM 5903 are used. Galvanized sheet metal or other suitable metal is used. The entire inside back wall of the cabinet is painted black to facilitate the viewing of the test specimen and pilot flame.

Burner - The burner is equipped with a variable orifice to adjust the flame height, a barrel having a ⅜ inch (10 mm) inside diameter and a pilot light. The burner may be constructed by combining a ⅜ inch (10 mm) inside diameter barrel 3±¼ inches (76±6 mm) long from a fixed orifice burner with a base from a variable orifice burner. The pilot light tube has a diameter of approximately 1/16 inch (2 mm) and is spaced ⅛ inch (3 mm) away from the burner edge with a pilot flame ⅛ inch (3 mm) long.

The necessary gas connections and the applicable plumbing are specified in FIG. 5903D of FTM 5903 except that a solenoid valve may be used in lieu of the stopcock valve to which the burner is attached. The stopcock valve or solenoid valve, whichever is used, is capable of being fully opened or fully closed in 0.1 second.

On the side of the barrel of the burner, opposite the pilot light there is a metal rod of approximately ⅛ inch (3 mm) diameter spaced ½ inch (13 mm) from the barrel and extending above the burner. The rod has two 5/16 inch (8 mm) prongs marking the distances of ¾ inch (19 mm) and 1½ inches (38 mm) above the top of the burner. The burner is fixed in a position so that the center of the barrel of the burner is directly below the center of the specimen.

Gas Regulator Valve System - A control valve system with a delivery rate designed to furnish gas to the burner under a pressure of 2½±¼ pounds per square inch (17.2 kPa±1.7 kPa) at the burner inlet. The manufacturer's recommended delivery rate for the valve system includes the required pressure.

Gas Mixture - A synthetic gas mixture of the following composition is used within the following limits (analyzed at standard conditions): 55±3 percent hydrogen, 24±1 percent methane. 3±1 percent ethane, and 18±1 percent carbon monoxide, which will give a specific gravity of 0.365±0.018 (air=1) and a B.T.U. content of 540±20 btu's per cubic foot (dry basis) at 70° F. (21° C.).

Stop Watch - A stop watch or other device is used to measure the burning time to 0.2 seconds.

Procedure

The material undergoing the test is evaluated for the flammability characteristic, e.g. after-flame time, after-glow time, on each specimen. All specimens are tested at moisture equilibrium under standard atmospheric conditions in accordance with Section 4 of this Standard. Each specimen is tested by exposing to the test flame within 20 seconds after removal from the standard atmosphere.

The specimen in its holder is suspended vertically in the cabinet in such a manner that the entire length of the specimen is exposed and the lower end is ¾ inch (19 mm) above the top of the gas burner. The apparatus is set up in a draft free area.

Prior to inserting the specimen, the pilot flame is adjusted to approximately ⅛ inch (3 mm) in height measured from its lowest point to the tip. The burner flame is adjusted by means of the needle valve in the base of the burner to give a flame height of 1½ inches (38 mm) with the stopcock fully open and the air supply to the burner shut off and taped. The 1κ inch (38 mm) flame height is obtained by adjusting the valve so that the uppermost portion (tip) of the flame is level with the top of the metal prong (see Figure 5903B) specified for adjustment of flame height. After inserting the specimen, the stopcock is fully opened, and the burner flame applied vertically at the middle of the lower edge of the specimen for 12 seconds and the burner turned off. The cabinet door remains shut during testing.

The after-flame time is the time the specimen continues to flame after the burner flame is shut off. The after-glow time is the time the specimen continues to glow after it has ceased to flame. If the specimen glows more than 30 seconds, the specimen holder containing the specimen is removed from the cabinet without any unnecessary rate of movement of the specimen which will fan the glow, and suspended in a draft-free area in the same vertical position as in the test cabinet. When more than one glowing specimen is suspended outside the test apparatus, the specimens are spaced at least 6 inches (152 mm) apart. The specimens remain stationary until all glowing has ceased. The glow is not extinguished even when the after-glow time is not being determined.

After each specimen is removed, the test cabinet is cleared of fumes and smoke prior to testing the next specimen.

Results

The after-flame time, after-glow time of the sample unit is the average of the results obtained from the individual specimens tested. All values obtained from the individual specimens are recorded. The after-flame time and after-glow time are reported to the nearest 0.2 second. The materials of this invention have shown after-flame times of less than 6.0 seconds and after-glow times of 0.0 seconds.

The multilaminate barriers of this invention have a flammability characteristic of less than about sixty seconds based on the Federal Test Method 5903 described above. The flammability characteristic is the same as the after flame time described above. The barriers have flammability characteristics of less than about sixty seconds preferably less than about thirty seconds, more preferably less than about twenty seconds, more preferably less than about six seconds, even more preferably less than about four or two seconds, and most preferably down to a time period approaching zero seconds. Presently, the government is requiring a flammability characteristic (after-flame time) of six seconds or less for materials used in some military situations.

Resistance to mustard and thickened GD toxicological agents is the ability of a material to resist passage of such agents from one side of the material to the other or allow eventual permeation of such agents at a slow rate. The resistance to such toxicological agents is measured using the methodology described in Chemical Research and Development Center - Special Procedure - 84010 (CRDC-SP-84010). This is an unpublished procedure, the contents of which are hereby expressly incorporated by reference. One of ordinary skill in the art would be able to determine this value by submitting their material to the Chemical Research and Development Center and having them conduct the appropriate test and rendering the results. From the limited published literature related to CRDC-SP-84010, it is determined that the resistance to permeation by mustard (HD) is determined by applying the chemical agent to the film surface in droplets at a concentration of 10 grams per square meter. Test specimens are obtained by cutting two, two inch diameter circular specimens from each sample with one determination made on the back side of each specimen. No test specimen is taken within two inches of the salvage edge. In the event that one of the two tested specimen meets the requirements of the government but the other does not, two additional test specimens are tested. The thickened (GD) toxicological agent is also applied to the material in droplets in a concentration of ten grams per square meter and the specimen is cut as described above from mustard.

The multilaminate barriers of the present invention have a resistance to mustard and thickened GD toxicological agents of at least about four hours up to at least about seventy-two hours based on the CRDC-SP-84010 methodology. The resistance may be at least about four hours, preferably at least about twelve hours, more preferably at least about twenty-four hours or at least about thirty-six hours, even more preferably at least about forty-eight hours and most preferably at least about seventy-two hours. Presently, the government is requiring a resistance to mustard and thickened GD toxicological agents of twenty-four hours as an acceptable standard for material being used under some chemical/biological warfare conditions.

This invention also pertains to a multilaminate barrier having a flammability characteristic of less than sixty seconds based on Federal Test Method 5903, as described above, and a resistance to mustard and thickening toxicologicl agents of at least about fifty minutes based on the methodology described in IAW Military Standard - 282, the contents of which are hereby expressly incorporated by reference. The materials of this invention have a resistance under IAW Military Standard - 282 of at least about fifty minutes, preferably at least about 100 minutes, more preferably at least about 180 minutes, and most preferably at least about 240 minutes.

The methodology of IAW Military Standard - 282, methods 204.1.1 and 206.11 are art recognized and available to the public, the contents of both the military standard method and the related methods identified are hereby expressly incorporated by reference. One of ordinary skill in the art would know how to conduct such tests on the material of the present invention after reading the published guidelines.

In a preferred embodiment, the present invention involves a combination of two basic components. The first component is a modification of conventional coextruded five-layer SARANEX ® film. Basically, the modification involves adding fire-retardant material such as a polymer of antimony trioxide to the low-density polyethylene layers which normally constitute the outer sandwiching layers of the SARANEX ® film. A further layer of low-density polyethylene may be added to one side of the modified SARANEX ® film to serve one or more purposes such as increasing abrasion resistance, carrying pigment or other additives to give desired coloration reflection characteristics or resistance to ultraviolet radiation or even to serve as a printing surface for such purposes as camouflage.

The second basic component of the barrier structure includes a layer of scrim woven from narrow tapes of high-density polyethylene material in which fire-retardant has been incorporated. The layer of scrim is then coated on both sides with molten layers of low-density polyethylene material which also incorporate fire-retardant additives. Finally, the two basic components are joined to form the fire-retardant barrier fabric of the invention.

In the upper part of FIG. 1, there is shown a first basic component made of SARANEX ® film modified in accordance with the present invention. As has been noted, conventional unmodified SARANEX ® film is composed of a layer of high-barrier resin such as SARAN ® sandwiched between outer layers of polyolefin resins. The high-barrier resin is a copolymer of vinylidene chloride and vinyl chloride which may or may not contain other additives and the outer layers are usually composed of low-density polyethylene.

The embodiment of FIG. 1, however, includes the usual high-barrier resin layer 12 approximately 0.25 (¼) mil in thickness sandwiched between outer adhesive layers 14 and 16 generally of EVA or LDPE which may also be about 0.200 (1/5) mil in thickness. To the top of the sandwich, an upper layer 18 of low-density polyethylene of about 0.675 (⅔) mil in thickness is applied, and at the bottom of the sandwich a similar lower layer 20 of low-density polyethylene of about 0.675 mil thickness is present. Both of these external layers of the first basic component incorporate about 10–30% fire-retardant material as a constituent, and the top layer may further include pigments for color, ultraviolet resistant additives and have a mat finish. Another additive may be included for the purposes of influencing the infrared reflectance.

Alternatively, yet another layer 29 of low-density polyethylene material of 0.50 to 2.0 mils in thickness may be laminated to the upper layer 18 for even greater abrasion resistance or to serve as a more rugged carrier of the color pigments of ultraviolet resistant materials. The total thickness of the first component may be from about one to about six mils.

The second basic component of the structure is shown in the lower part of FIG. 1. It includes a substrate 22 in the form of a layer of scrim of about 3.0 mils in thickness. The scrim is woven from yarn or narrow tapes of high-density polyethylene material (HDPE) approximately 1.5 mils in thickness which also incorporated 0.5–10% fire-retardant material in both the warp and the fill. The scrim may be of 950±50 denier of about 10×10 count with no color added.

Coatings or laminations 24 and 26 of low-density polyethylene material each of about 0.50 to 2 mils in thickness are bonded to the upper and lower scrim surfaces respectively. The coating 24, especially when serving as an adhesive layer, may be somewhat thinner than-the layer 26. In the coating layers 24 and 26, there is also included 10–30% fire-retardant material.

The two primary components are joined together to form the composite barrier fabric. Several methods of joining the layers are practical. For example, the films may be sealed together without adhesive by bringing the layers to a softening point and passing them between pressure rolls. To achieve a successful bond, the heat, pressure, and dwell time must be adjusted in accordance with the type and thickness of the film materials.

Alternatively, an adhesive coating or layer 28 may be used between components, and the adhesive may be activated by a suitable hot roll.

Figure 2:
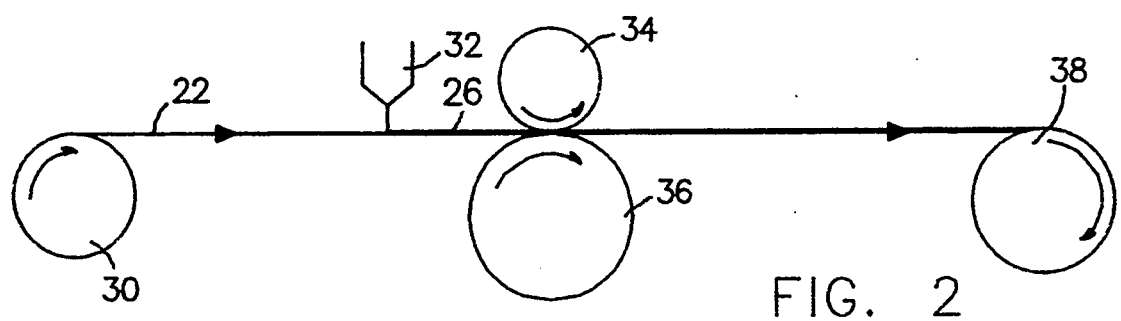
FIG. 2 illustrates one process step in making the composite fabric of the invention.

FIG. 2 illustrates schematically equipment for conducting the first step in laminating scrim or second basic component to its adjacent layers. A roll of uncoated scrim material of the type described above is carried on the reel 30. The scrim material is passed from the supply reel under an extruder die 32, from which a layer of low-density polyethylene material is deposited upon one surface of the scrim to a thickness of 0.5 to 2.0 mils. The deposited layer may contain fire-resistant material as well as other additives if desired. As the scrim continues from left to right as shown in the drawing, it passes between a nip roll 36 and a chill roll 34. The nip roll is Teflon®-coated, and the-chill roll may have a surface which produces a mat finish. The coated scrim roll is then accumulated on a wind-up roll 38.

Figure 3:
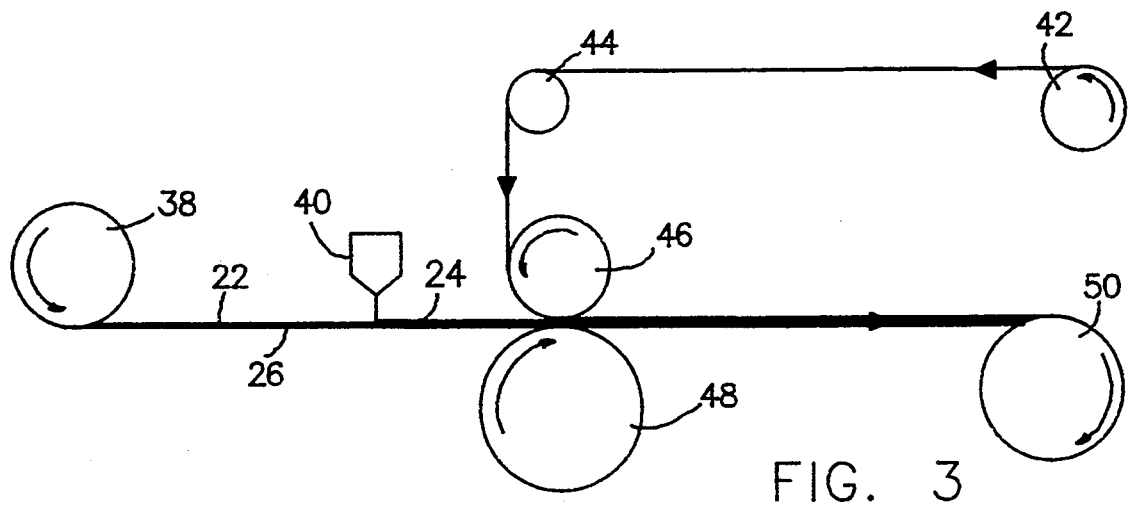
FIG. 3 similarly shows another process of making the composite fabric.

FIG. 3 illustrates a second step in the process. Coated scrim material from the reel 38 with the uncoated side facing upwardly is passed beneath another extruder die 40, at which point a layer of low-density polyethylene material also with added fire-resistant material is deposited to a depth of about 1-2 mil. Modified SARANEX® film from a reel 42 is unwound in a right-to-left direction about an idler roll 44 to be joined with the scrim material as both components are passed between a nip roll 48 and a chill roll 46. The modified SARANEX® film component from the reel 42 may include color and/or UV infrared reflectance additives as well as fire-resistant material. The composite product emerges from the rolls 46 and 48 and is taken up on a wind-up reel 50.

The sequence may be repeated if it is desired to add further layers of material for color or pattern printing on either or both of the outer surfaces.

Throughout this specification, reference has been made to "fire-retardant" material to be incorporated in or added to various components. Except in the scrim, as noted above, the preferred material is a polymer of antimony trioxide containing an activated brominated compound in 10–30% concentration. The polymer may also contain stabilizers. By way of example, the chemical composition of one of the layers used is (in percentages):

75.7 LDPE Virgin Resin
5.4 Color Pigment
18.9 Fire Retardant

The LDPE should be an extrusion grade resin such as that sold under the trade names Eastman Kodak #808P or Southern Petro NA 203. The melt index may be varied, but one of about 7 is preferred. The color pigment may be AMPACET LD 0925 and the fire retardant may be PPG Industries #FSPE 105 or equivalent materials.

The various examples and processes described above have in common the incorporation of fire-retardant antimony trioxide, brominated additives and stabilizers in the low-density polyethylene layers which normally serve as the outer layers of SARANEX® film. In most instances, it is desirable that fire-retardant material also be incorporated in various other polyethylene layers as well as in the scrim material. However, it is the modification of the SARANEX® layer and its combination with the woven scrim having fire-retardant constituents which contribute greatly to the fire-retardant and chemical barrier qualities in the ultimate barrier product. Thus, the present invention should not be limited to precise details of the examples or processes, but only by the spirit and scope of the appended claims.

What is claimed is:

1. A fire retardant barrier comprising:
   a first film component including a plurality of layers containing a fire retardant material, at least one of said plurality of layers being attached to at least one layer of polymeric material to provide resistance to chemical and biological agents; and
   a second component attached to the first component including a polymeric material layer for imparting strength to the fire retardant barrier.

2. A barrier as claimed in claim 1 wherein the first component contains at least three layers and the layer providing resistance to chemical and biological agents has layers on opposite sides thereof.

3. A barrier as claimed in claims 1 or 2 wherein the second component includes a layer of scrim.

4. A barrier as claimed in claim 3 wherein the scrim is woven from a high-density polyolefin material sandwiched between two layers of low-density polyolefin material.

5. A barrier as claimed in claim 4 wherein the polyolefin is polyethylene.

6. A barrier as claimed in claim 4 wherein the high-density polyolefin material or at least one of the low-density polyolefin layers contains a fire retardant material.

7. A barrier as claimed in claim 6 wherein all of the polyolefin material in the second component contains fire retardant material.

8. A barrier as claimed in claim 1 wherein the first layer of the first component is a film selected from the group consisting of a five layered low density polyethylene/ethyl vinyl acetate/copolymer of vinylidene chloride and vinyl chloride/ethyl vinyl acetate/low density polyethylene film; a nylon/copolymer of vinylidene chloride and vinyl chloride hybrid film; ethylene vinyl alcohol film, and combinations thereof.

9. A barrier as claimed in claim 8 wherein the first layer of the first component is a five layered low density polyethylene/ethyl vinyl acetate/copolymer of vinylidene chloride and vinyl chloride/ethyl vinyl acetate/-low density polyethylene film.

10. A barrier as claimed in claim 2 wherein the fire retardant material in each of the respective layers are independently the same or different.

11. A barrier as claimed in claim 10 wherein the fire retardant material in at least one of the layers is antimony trioxide.

12. A fire retardant barrier comprising:

a first component including a first layer containing a fire retardant material for resisting chemical and biological agents, and second and third layers on opposite sides of the first layer at least one of which contains a fire retardant material; and a second component including a layer of scrim woven made of high-density polyethylene material and a layer of low-density polyethylene material.

13. A barrier as claimed in claim 12 wherein the second and third layers both contain a fire retardant material.

14. A barrier as claimed in claim 12 wherein all of the polyethylene containing layers contain a fire retardant material.

15. A multilaminate barrier having a flammability characteristic of less than about 60 seconds based on Federal Test Method 5903 and a resistance to mustard and thickened GD toxicological agents of at least about 4 hours based on Chemical Research and Development Center - Special Procedure 84010;

wherein said multilaminate barrier includes a first film component including a plurality of layers containing a fire retardant material, at least one of said plurality of layers being attached to at least one layer of polymeric material to provide resistance to chemical and biological agents; and a second component attached to the first component including a polymeric material layer for imparting strength to the fire retardant barrier.

16. A barrier as claimed in claim 15 having a flammability characteristic of less than about 30 seconds.

17. A barrier as claimed in claim 15 having a flammability characteristic of less than about 20 seconds.

18. A barrier as claimed in claim 15 having a flammability characteristic of less than about 6 seconds.

19. A barrier as claimed in claim 15 having a flammability characteristic of less than about 4 seconds.

20. A barrier as claimed in claim 15 having a flammability characteristic of less than about 2 seconds.

21. A barrier as claimed in claim 15 having a flammability characteristic approaching zero seconds.

22. A barrier as claimed in claim 15 having a resistance to mustard and thickened GD toxicological agents of at least about 12 hours.

23. A barrier as claimed in claims 15 or 18 having a resistance to mustard and thickened GD toxicological agents of at least about 24 hours.

24. A barrier as claimed in claim 15 having a resistance to mustard and thickened GD toxicological agents of at least about 36 hours.

25. A barrier as claimed in claim 15 having a resistance to mustard and thickened GD toxicological agents of at least about 48 hours.

26. A barrier as claimed in claim 15 having a resistance to mustard and thickened GD toxicological agents of at least about 72 hours.

27. A multilaminate barrier having a flammability characteristic of less than about 20 seconds based on Federal Test Method 5903 and a resistance to mustard and GD toxicological agents of at least about 50 minutes based on IAW Military Standard - 282;

wherein said multilaminate barrier includes a first film component including a plurality of layers containing a fire retardant material, at least one of said plurality of layers being attached to at least one layer of polymeric material to provide resistance to chemical and biological agents; and a second component attached to the first component including a polymeric material layer for imparting strength to the fire retardant barrier.

28. A barrier as claimed in claim 27 having a resistance to mustard and GB toxicological agents of at least about 100 minutes.

29. A barrier as claimed in claim 27 having a resistance to mustard and GB toxicological agents of at least about 180 minutes.

30. A barrier as claimed in claim 27 having a resistance to mustard and GB toxicological agents of at least about 240 minutes.

31. A barrier as claimed in claim 28 having a flammability characteristic of less than about six seconds.

32. A barrier as claimed in claim 1 wherein said first component includes about 10 to about 30% fire-retardant material.

33. A barrier as claimed in claims 3 or 4 wherein said scrim comprises a substrate woven from tapes of approximately 950 denier and $10 \times 10$ count per inch in warp and fill.

34. A barrier as claimed in claim 3 wherein said scrim includes 0.5 and 10% fire-retardant material.

35. A barrier as claimed in claim 1 wherein said first component is from about 1 to about six millimeters in thickness and said second component includes a scrim layer of about three millimeters in thickness.

36. A barrier as claimed in claim 35 and further including a top layer of about 0.5 to about 2.0 millimeters thick relatively low-density polyethylene material laminated to the first layer of said first component to add abrasion resistance and serve as a carrier of pigments.

37. A fire-retardant barrier, comprising:

a first component including a plurality of polyolefin-containing layers having a fire-retardant material combined therewith, at least one of said plurality of layers attached to at least one layer of polymeric film, and a second component attached to the first component, said second component including a multilayer system made of a high-density polymer sandwiched between two layers of low-density polymer.

38. The barrier of claim 37, wherein the high-density polymer and low-density polymer comprise polyolefins.

39. The barrier of claim 38, wherein the polyolefin is polyethylene.

40. The barrier of claim 37, wherein the multilayer system comprises woven scrim.

* * * * *